United States Patent [19]

Camplin et al.

[11] Patent Number: 4,482,366

[45] Date of Patent: Nov. 13, 1984

[54] PULSE-TYPE CLEANING MEANS FOR FILTER PANELS

[75] Inventors: Harry R. Camplin, Marine; Patrick Golden, Minneapolis, both of Minn.

[73] Assignee: The United States of America as represented by the Secretary of the Army, Washington, D.C.

[21] Appl. No.: 508,783

[22] Filed: Jun. 29, 1983

[51] Int. Cl.³ .................. B01D 46/04; F15C 1/08
[52] U.S. Cl. .................. 55/273; 55/294; 55/302; 137/835
[58] Field of Search .......... 55/273, 283, 284, 294, 55/302; 137/509, 510, 513, 535

[56] References Cited

U.S. PATENT DOCUMENTS

| | | | |
|---|---|---|---|
| 3,158,166 | 11/1964 | Warren | 137/835 |
| 3,185,166 | 5/1965 | Horton et al. | 137/835 |
| 3,394,532 | 7/1968 | Oetiken | 55/302 |
| 3,936,902 | 2/1976 | Shacklaton | 55/302 X |
| 4,266,953 | 5/1981 | Matthys et al. | 55/294 |
| 4,293,320 | 10/1981 | Robinson | 55/273 |

Primary Examiner—Charles Hart
Attorney, Agent, or Firm—Peter A. Taucher; John E. McRae; Robert P. Gibson

[57] ABSTRACT

The process of removing embedded particulates from the pore surfaces of an engine air cleaner (pleated paper type) is facilitated by blowing pulses (or jets) of compressed air through the filter media in the reverse flow direction. The invention relates to the employment of a fluidic oscillator for producing the air pulses. The oscillator is used in a switching mode such that alternate pulses are applied to different air cleaner sections. Overall objective is to achieve an effective cleaning action with a relatively small quantity of compressed air.

6 Claims, 4 Drawing Figures

U.S. Patent   Nov. 13, 1984   Sheet 1 of 2   4,482,366
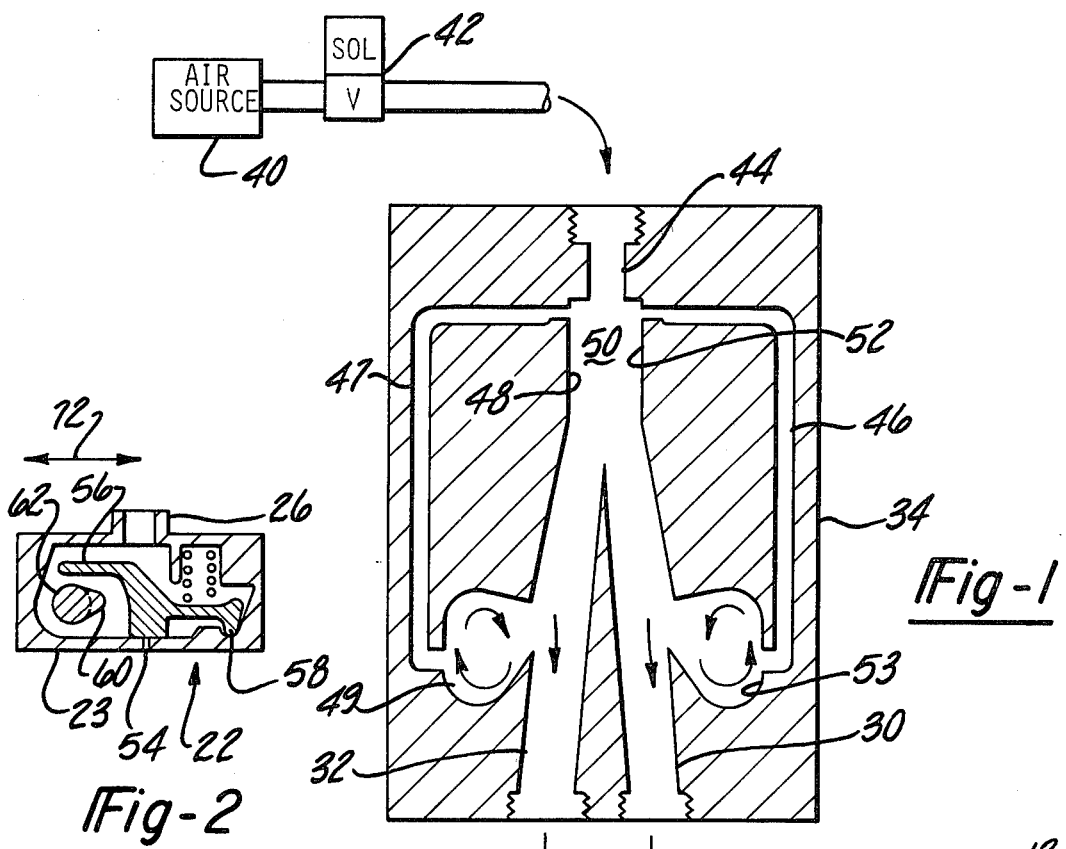
Fig-1
Fig-2
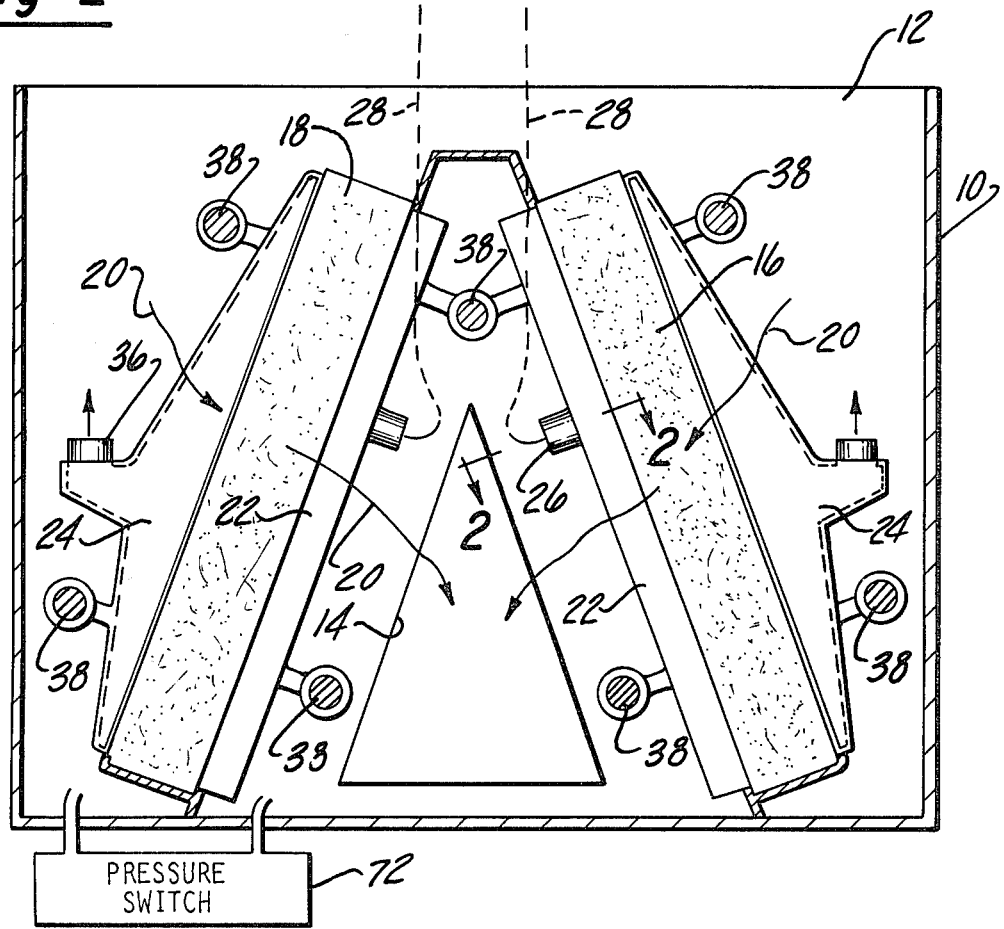

PULSE-TYPE CLEANING MEANS FOR FILTER PANELS

GOVERNMENT INTEREST

The invention described herein may be manufactured, used, and licensed by or for the Government for governmental purposes without payment to us of any royalty thereon.

SUMMARY OF THE INVENTION

This invention relates to engine air cleaners, especially air cleaners for turbine engines requiring high air mass flow rates. The air cleaner may be constructed generally as shown in U.S. Pat. No. 4,266,953 issued to B. A. Mathys, D. W. Schoen ad C. C. Anderson. The present invention is concerned with a mechanism for generating a pulsating air blast to remove particulates trapped on the filter media surface during engine-running periods. The principal feature of our invention is the use of a fluidic oscillator for generating air pulsations; a nozzle structure applies the air pulsations to the downstream face area of a porous fabric filter element to dislodge particulates trapped on the fabric upstream surface. Preferred pulsation frequency is sufficient to impart a vibrating motion to the fabric material, thereby enhancing the particulate-removal action.

We have designed the particulate-removing system so that fluidic oscillator outputs are alternately applied to different air blast nozzle structures associated with different filter panels; i.e. a first air pulse is directed to a first nozzle, a second air pulse is directed to a second nozzle, a third air pulse is applied to the first nozzle, and so on. The system effectively cleans two filter panels with a lesser total compressed air quantity than would be required if a continuous air jet were applied to each filter panel.

THE DRAWINGS

FIG. 1 is a cross-sectional view taken through an air cleaner embodying our invention.

FIG. 2 is a fragmentary sectional view on line 2—2 in FIG. 1.

Figure 3:
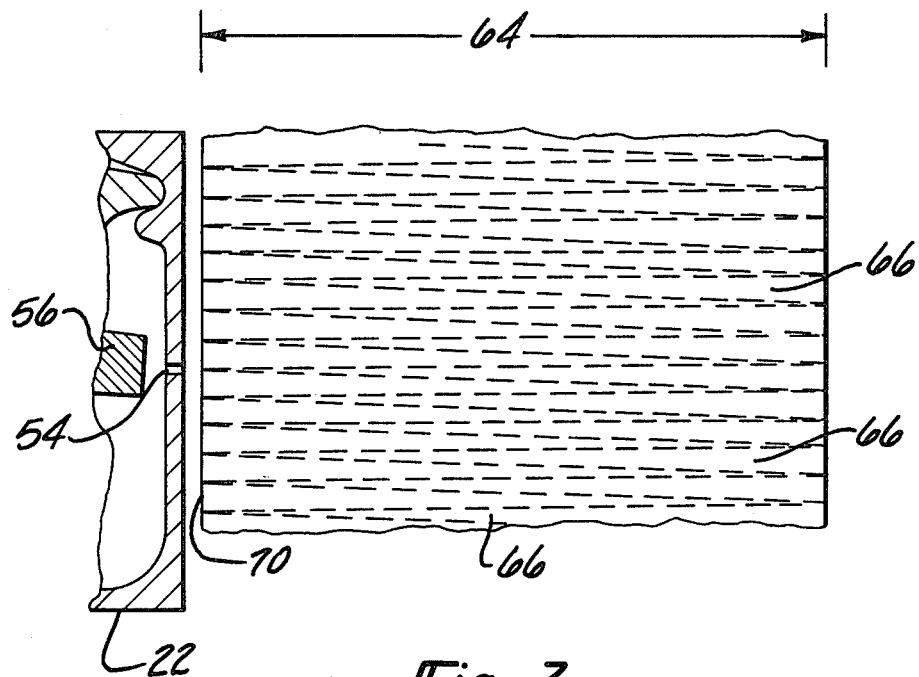
FIG. 3 is an enlarged fragmentary view illustrating a nozzle-filter media relationship employed in the FIG. 1 structure.

Referring in greater detail to FIG. 1, there is shown an engine air cleaner system constructed generally like the system shown in aforementioned U.S. Pat. No. 4,266,953. The system comprises a rectangular box 10 having a dusty air inlet opening 12 and a clean air outlet opening 14. Disposed within box 10 are two rectangular filter panels 16 and 18 arranged in an inverted V-shaped orientation. Air flows through the panels in generally oblique downward directions as designated by arrows 20 in FIG. 1.

To remove particulates trapped in the filter media there is provided for each filter panel an air blast nozzle structure 22 and a cooperating particulate-receiving structure 24. Each nozzle structure 22 comprises a housing 23 (FIG. 2) having a tubular air intake element 26 adapted to receive thereon a flexible hose (not shown). Each hose (designated by the dashed line 28 in FIG. 1) extends from output channel 30 or 32 of a fluidic oscillator 34. Pulses of air generated in channels 30 and 32 of the oscillator are applied through hoses 28 on a time-staggered basis to the individual nozzle structures 22. Each nozzle structure directs air pulses reversely through the porous filter filter media in the associated filter panel 16 or 18. Particulates are blown into the associated receiver 24. A hose, not shown, is connected to tubular outlet element 36 on each receiver to discharge airborne particulates to a non-illustrated aspirator or other low pressure zone.

The nozzle structures 22 and associated receivers 24 are cooperatively mounted on nuts that mesh with ball screws 38 extending normal to the plane of the paper. Simultaneous rotational movements of the various screws around their individual axes cause nozzles 22 and receivers 24 to move along the faces of the filter panels, as described more completely in the referenced U.S. Pat. No. 4,266,953. The ball screws are of the self-reversing type whereby nozzles 22 and receivers 24 can be moved back and forth a sufficient number of times to completely clean each filter panel.

The present invention is concerned primarily with fluidic oscillator 34 for generating air pulses that are subsequently applied through hoses 28 to nozzle structures 22. Oscillator 34 is supplied with pressurized air from a relatively constant air pressure source 40. Source 40 may in practice be the air compressor forming part of the turbine engine. Source 40 supplies pressurized air through a solenoid valve 42 to air input channel 44 of the oscillator. The oscillator includes feedback passages 46 and 47 for alternately directing control pulses against the power airstream issuing from channel 44 into chamber 50. Assuming passage 46 is at a pressure higher than passage 47, the power stream will lock onto attachment surface 48, thereby directing the stream into channel 32. A minor part of the power stream is directed into chamber 49 which eventually produces an increased pressure in passage 47. A control jet then issues from passage 47 into the interaction chamber 50, thereby causing the power stream to lock onto attachment surface 52. The power stream is thus switched from output channel 32 to output channel 30. After a period of time a control pressure is developed in chamber 53 for increasing the control pressure in passage 46 to thus switch the power stream back to output channel 32. The switching process occurs on a continuous basis as long as pressurized air is applied through solenoid valve 42 to the intake channel 44. Closing solenoid valve 42 deactivates the oscillator.

Preferably the oscillating action is such that pressurized air flows instantaneously through channel 30 or through channel 32 on an exclusive basis, i.e. the instantaneous flow is through one channel or the other channel but not simultaneously through both channels. Preferred oscillation frequency is approximately 35 oscillations per second. Some variation in oscillation frequency can be tolerated without serious adverse effects on the particulate removal action of each nozzle structure 22. For example, an oscillation frequency between 20 and 40 oscillations per second is believed to constitute an acceptable range. The pressure source 40 should be sufficient that each air pulse delivered to nozzle structure 22 has a pressure of at least approximately 25 p.s.i.g.

Each nozzle structure 22 has an elongated slot-like orifice 54 presented to the downstream face area of filter panel 16 or 18. The length of orifice 54 corresponds to the height of the filter panel. A number of spring-urged valve elements 56 are arranged in nozzle housing 23 to close different sections of orifice 54. During each traverse of the nozzle structure across the filter panel only one of the valve elements 56 will be in an open condition; the other valve elements will be closed. The number of valve elements 56 corresponds to the number of traverses of the nozzle structure required to accomplish complete cleaning of an air filter panel; e.g. if four valve elements 56 are used then four traverses of the nozzle structure are required to clean the filter panel. Use of valve elements 56 reduces the effective flow area of orifice 54 and thus contributes to a higher and more uniform air blast pressure during each traverse of the nozzle structure.

As seen in FIG. 2, a representative spring-urged valve element 56 is swingable around pivot point 58. The various valve elements 56 are individually opened by separate cams 60 carried on a rotary shaft 62. The shaft carries a non-illustrated ratchet mechanism that is actuated by fixed abutments as nozzle structure 22 reaches the end of its motion. At such time the ratchet mechanism is operated to rotate shaft 62 through a predetermined arcuate distance, sufficient to enable the next cam 60 to operate the associated valve element 56 to its opened condition. On the next traverse of the nozzle structure 22 in the reverse direction the opened orifice 54 will discharge pulses of air into the target zone on the associated filter panel, thereby removing trapped particulates from that area of the panel. The number of cams 60 on shaft 62 is determined by the number of valve elements 56, i.e. each valve element will have its own actuating cam 60. The cams will be spaced equi-distantly around shaft 62 so that each ratchet action will advance one of the cams 60 to a position for operating its valve element 56 to an opened condition.

Figure 4:
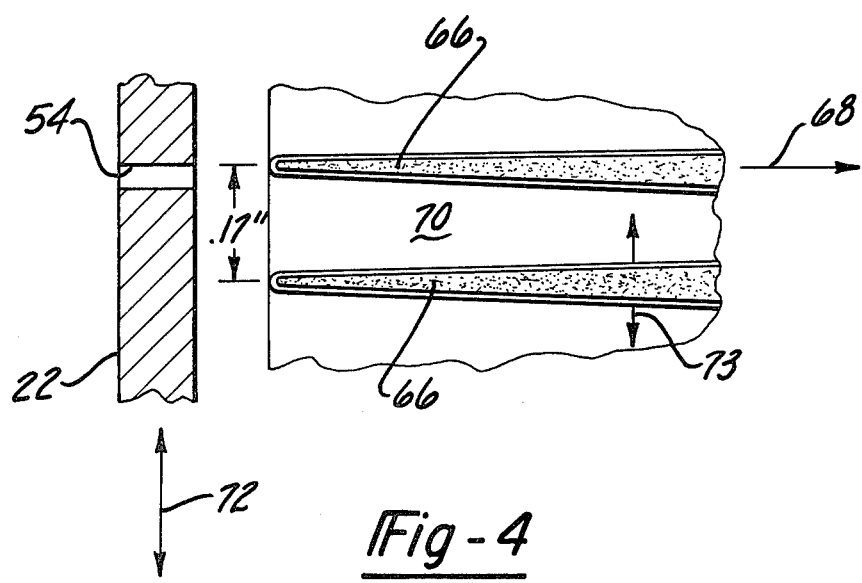
FIG. 4 is an enlargement of a portion of the FIG. 3 componentry.

Each filter panel 16 or 18 may be comprised of a porous fabric sheet formed into a series of the V-shaped pleats, as shown generally in FIGS. 3 and 4 of the drawings. The pleated fabric structure necessarily provides a relatively large total surface area; however the V-shaped pleats are necessarily very narrow and very closely spaced together. In one particular arrangement the pleats had a spacing of about six pleats per inch of panel length; the thickness of the panel as designated by numeral 64 in FIG. 3, was about four inches. The resultant V-shaped pockets in the panel provided a relatively large total fabric surface area (very desirable for a filter panel handling high air mass flow rates, e.g. for turbine engines). The narrow V-shaped cavities 66 are disadvantageous in that particulates tend to imbed or pack into the apex areas of cavities 66 (FIG. 4). The air blast mechanism shown in FIGS. 3 and 4 is designed to direct pulses of air against the downstream faces of the pleated fabric for imparting rapid oscillating flexural motions to the fabric material. The air pulses also pressurize zones 66 to thus entrain particulates into the air stream that flows in the arrow 68 direction toward the associated receiver 24.

In the above described filter panel construction a fabric pleat spacing of six pleats per inch equates to a space 70 mouth opening of about 0.17 inch. In one case the associated orifice slot 54 in nozzle structure 22 had a width of about 0.03 inch; the nozzle structure was designed to have a travel speed in the arrow 72 direction of about two inch per second. Assuming pulse oscillation frequency of about 30 oscillations per second, there would be 15 pulses of air discharged through each orifice 54 during each second (the other 15 pulses would be discharged through the nozzle structure associated with the other filter panel). Each nozzle structure 22 would travel across a given fabric pleat space 70 in about 0.08 second. In that space of time there would be about 1.2 air pulsations. Thus, each fabric pleat would undergo at least one transverse flexural motion, as denoted by arrow 73 in FIG. 4. It is believed desirable that air pulse frequency be sufficient to impart a vibratory motion to each pleat of the fabric material in order to achieve an optimum effect on particulates in zones 66. Particulate dislodgement action is preferably achieved by the combined effect of the air pressure on the individual particles and the transverse vibrational motion of the media fabric.

It will be appreciated that nozzles 22 and receivers 24 would be moved back and forth across the faces of the filter panels, only when required to effect cleaning operations. The frequency of cleaning operations is preferably related to the dust accumulations in zones 66. When the air flowing through the filter panels is relatively dust-free a less frequent cleaning is necessary than when the air has a higher dust content. The need for cleaning may be sensed by a conventional pressure switch 72 (FIG. 1) responsive to the pressure drop across one or both filter panels. The pressure switch would be electrically connected with solenoid valve 42 so that when the pressure drop across the filter panel is above a predetermined value solenoid valve 42 will be energized to enable compressed air from source 40 to be admitted to oscillator 34 and ultimately to nozzle structures 22.

Oscillator 34 is shown to be outside box 10, but this is merely for illustration purposes; in practice the oscillator would be located within box 10. Also a cooler (heat exchanger) would be located between air pressure source 40 and valve 42 to cool the relatively hot compressed air to a satisfactory temperature before admission to nozzles 22. It will be understood that valve 42 would be operated in synchronization with the motor mechanism used to rotate the various ball screws 38. Thus, air pulses are admitted to nozzle structure 22 only while such structures are being moved back and forth across the faces of filter panels 16 and 18. As previously noted, fluidic oscillator 34 is operated so that alternate air pulses are applied to alternate ones of nozzles 22 on a time-staggered basis. Thus, in the example wherein pulse frequency is thirty oscillation per second, fifteen pulses per second would be applied to the nozzle structure associated with panel 16, and fifteen pulses would be applied to the nozzle structure associated with filter panel 18. The oscillator is preferably of a type having no moving parts.

We wish it to be understood that we do not desire to be limited to the exact details of construction shown and described for obvious modifications will occur to a person skilled in the art, without departing from the spirit and scope of the appended claims.

We claim:

1. An engine air cleaner comprising first and second air filter panels having particulate trapping media therein; means for periodically removing particulates from said media trapped in each panel; said removing means comprising a first air blast nozzle structure arranged to move along the downstream face of the first panel, and a second air blast nozzle structure arranged to move along the downstream face of the second panel; an air pressure source; and a fluidic oscillator interposed between the air pressure source and particulate removing means; said fluidic oscillator comprising an air input channel connected to the pressure source, a first output channel connected to the first air blast nozzle structure, and a second output channel connected to the second air blast nozzle structure; the instantaneous output of the oscillator being through either the first output channel or the second output channel but not simultaneously through both output channels, whereby each nozzle structure is supplied with pulses of air on a time-staggered basis; each filter panel comprising a porous fabric sheet formed into a series of V-shaped pleats; each nozzle structure being arranged for movement transversely across the V-shaped pleats whereby the nozzle structure discharges its blast of air into successive ones of the V spaces as the nozzle structure moves along the filter panel face; the V-shaped pleats in each filter panel having substantial amplitude dimensions normal to the nominal plane of the panel, whereby the porous fabric sheet material has substantial flexibility; the movement rate of each nozzle structure being related to the pleat width and pulse frequency whereby the porous fabric material in each V-shaped pleat undergoes at least one rapid oscillating flexural motion due to air blast pulsations generated by the associated nozzle structure.

2. The engine air cleaner of claim 1 wherein the fluidic oscillator has an oscillation frequency between 20 and 40 oscillations per second.

3. The engine air cleaner of claim 1 wherein the fluidic oscillation frequency of approximately 35 oscillations per second.

4. The engine air cleaner of claim 1 wherein the fluidic oscillator has an oscillation frequency of approximately 35 oscillations per second, and each nozzle structure has a discharge orifice whose width measured in the direction of nozzle structure travel is substantially less than the width of each V-shaped pleat.

5. The engine air cleaner of claim 1 wherein the fluidic oscillator has an oscillation frequency of approximately 35 oscillations per second, each nozzle structure has a discharge orifice measuring about 0.03 inch in the direction of nozzle structure travel, the pleat width is about six pleats per inch of panel length, and the movement rate of the nozzle structure is approximately two inches per second.

6. The engine air cleaner of claim 1 wherein the fluidic oscillator has an oscillation frequency of approximately 35 oscillations per second, each nozzle structure has a discharge orifice measuring about 0.03 inch in the direction of nozzle structure travel, the pleat width is about 0.17 inch, and the pleat amplitude measured in a direction normal to the nominal plane of the filter panel is about four inches.

* * * * *